US012616631B2

(12) United States Patent
Wang

(10) Patent No.: US 12,616,631 B2
(45) Date of Patent: *May 5, 2026

(54) SEX TOY

(71) Applicant: Dongguan Mimao Electronic Technology Co., Ltd., Dongguan (CN)

(72) Inventor: Qinling Wang, Heyuan (CN)

(73) Assignee: Dongguan Mimao Electronic Technology Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/945,496

(22) Filed: Nov. 12, 2024

(65) Prior Publication Data

US 2025/0161151 A1 May 22, 2025

Related U.S. Application Data

(63) Continuation-in-part of application No. 18/516,984, filed on Nov. 22, 2023, now Pat. No. 12,161,598.

(51) Int. Cl.
*A61H 19/00* (2006.01)

(52) U.S. Cl.
CPC ....... *A61H 19/32* (2013.01); *A61H 2201/169* (2013.01)

(58) Field of Classification Search
CPC ........ A61H 19/00; A61H 19/30; A61H 19/32; A61H 7/00; A61H 7/002; A61H 7/003; A61H 7/004; A61H 7/005; A61H 7/007; A61H 23/00; A61H 23/006; A61H 23/02; A61H 23/0254; A61H 23/0245;
(Continued)

(56) References Cited

U.S. PATENT DOCUMENTS

| | | | |
|---|---|---|---|
| 6,190,339 | B1 | 2/2001 | Imazaike et al. |
| 11,554,073 | B1 | 1/2023 | Guo |

(Continued)

FOREIGN PATENT DOCUMENTS

| | | |
|---|---|---|
| CN | 104352254 A | 2/2015 |
| CN | 106344382 A | 1/2017 |

(Continued)

OTHER PUBLICATIONS

Notice of Refusal Dated Dec. 17, 2024 for Corresponding Japan Application No. 2024-201869.

(Continued)

*Primary Examiner* — Colin W Stuart

(57) ABSTRACT

A sex toy includes a flexible first stimulation portion, a vibration member and a flexible second stimulation portion. The flexible first stimulation portion includes a first massage finger provided on a first side and a second massage finger provided on a second side opposite to the first side. The first massage finger extends toward the second side, the second massage finger extends toward the first side, and the first massage finger and the second massage finger cooperatively enclose a first cavity. The vibration member is provided at the flexible first stimulation portion. The flexible second stimulation portion is provided at one end of the first stimulation portion and provided with a second cavity. The first cavity is communicated with the second cavity to collectively form a stimulation chamber for accommodating a male penis.

22 Claims, 11 Drawing Sheets

(58) Field of Classification Search
CPC ............ A61H 23/0263; A61H 2201/12; A61H 2201/1215; A61H 2201/1676; A61H 2205/085; A61H 2205/087
See application file for complete search history.

(56) References Cited

U.S. PATENT DOCUMENTS

| | | | | |
|---|---|---|---|---|
| 11,806,306 | B1 | 11/2023 | Guo | |
| 11,857,483 | B1 * | 1/2024 | Huang | A61H 19/32 |
| 11,925,592 | B1 * | 3/2024 | Huang | A61H 19/32 |
| 12,161,598 | B1 * | 12/2024 | Wang | A61H 23/0263 |
| 2015/0065792 | A1 | 3/2015 | Levine | |
| 2016/0317380 | A1 * | 11/2016 | Gutierrez Villanueva | A61H 19/40 |
| 2019/0209359 | A1 | 7/2019 | Trost et al. | |
| 2019/0240109 | A1 | 8/2019 | Barkay | |
| 2020/0368103 | A1 | 11/2020 | Rakshit | |
| 2022/0096320 | A1 | 3/2022 | Lu | |
| 2023/0080795 | A1 * | 3/2023 | Raju | A61H 9/005 600/38 |
| 2023/0372191 | A1 * | 11/2023 | Gu | A61H 9/0078 |

FOREIGN PATENT DOCUMENTS

| | | | | | |
|---|---|---|---|---|---|
| CN | 106726416 | A | * | 5/2017 | |
| CN | 107551410 | A | | 1/2018 | |
| CN | 210872865 | U | | 6/2020 | |
| CN | 211584149 | U | | 9/2020 | |
| DE | 202023102232 | U1 | * | 6/2023 | A61H 19/32 |
| JP | 2010125335 | A | | 6/2010 | |
| JP | 2020081721 | A | | 6/2020 | |
| KR | 101310270 | B1 | | 9/2013 | |
| WO | 2014096476 | A1 | | 6/2014 | |
| WO | 2023194974 | A1 | | 10/2023 | |

OTHER PUBLICATIONS

Notice of Refusal Dated Jan. 28, 2025 for Corresponding Japan Application No. 2024-203424.

Notice of Refusal Dated Feb. 18, 2025 for Corresponding Japan Application No. 2024-202360.

The Extended European Search Report Issued on Aug. 12, 2025 for Corresponding European Patent Application No. 24214864.1.

Written Opinion of the International Searching Authority Dated Mar. 19, 2025 for Corresponding PCT Application PCT/CN2024/134000.

International Search Report Dated Mar. 19, 2025 for Corresponding PCT Application PCT/CN2024/134000.

Office Action Dated Apr. 10, 2025 for Corresponding European Patent Application No. 24214864.1.

* cited by examiner

SEX TOY

CROSS REFERENCE TO RELATED APPLICATIONS

The present application is a Continuation in part Application of U.S. patent application Ser. No. 18/516,984, filed on Nov. 22, 2023, the entire contents of which are hereby incorporated by reference.

TECHNICAL FIELD

The present application relates to the technical field of adult products, and in particular to a sex toy.

BACKGROUND

In recent years, adult sex products are developed to help the users to release their sex pressure. Generally, an existing sex toy uses a vibration motor to provide vibration to the user's sensitive areas, such as the female genitalia, the male genitalia and the like, which has poor stimulation effects and is therefore difficult to meet users' needs.

SUMMARY

An object of the present application is to provide a sex toy which can provide better stimulation effects, thereby improving the sexual experience.

In order to achieve the above object, the present application provides a sex toy including a flexible first stimulation portion, a vibration member and a flexible second stimulation portion. The flexible first stimulation portion includes a first massage finger provided on a first side and a second massage finger provided on a second side opposite to the first side. The first massage finger extends toward the second side, the second massage finger extends toward the first side, and the first massage finger and the second massage finger cooperatively enclose a first cavity. The vibration member is provided at the flexible first stimulation portion. The flexible second stimulation portion is provided at one end of the first stimulation portion and provided with a second cavity. The first cavity is communicated with the second cavity to collectively form a stimulation chamber for accommodating a male penis.

Compared with the prior art, the sex toy according to the embodiments of the present application includes a flexible first stimulation portion defined with a first cavity and a flexible second stimulation portion defined with a second cavity. The first cavity and the second cavity are communicated and collectively form a stimulation chamber for accommodating the male penis. During use, the male penis can be placed inside the stimulation chamber without the need for hand holding, making it more convenient to operate. In addition, the two stimulation portions stimulate different areas of the male penis, thereby providing a diversified stimulation effect and enhancing the user's pleasure.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of the present application is for the purpose of describing specific embodiments only and is not intended to limit the present application.

Referring to FIG. 1 to FIG. 6, a sex toy 100 according to an embodiment of the present application is shown. The sex toy 100 includes a flexible first stimulation portion 40, a vibration member 90, and a flexible second stimulation portion 60. The first stimulation portion 40 and the second stimulation portion 60 include soft materials, such as resin or rubber, for direct contact with the male penis, thereby providing a more comfortable user experience with the sex toy 100.

Figure 2:
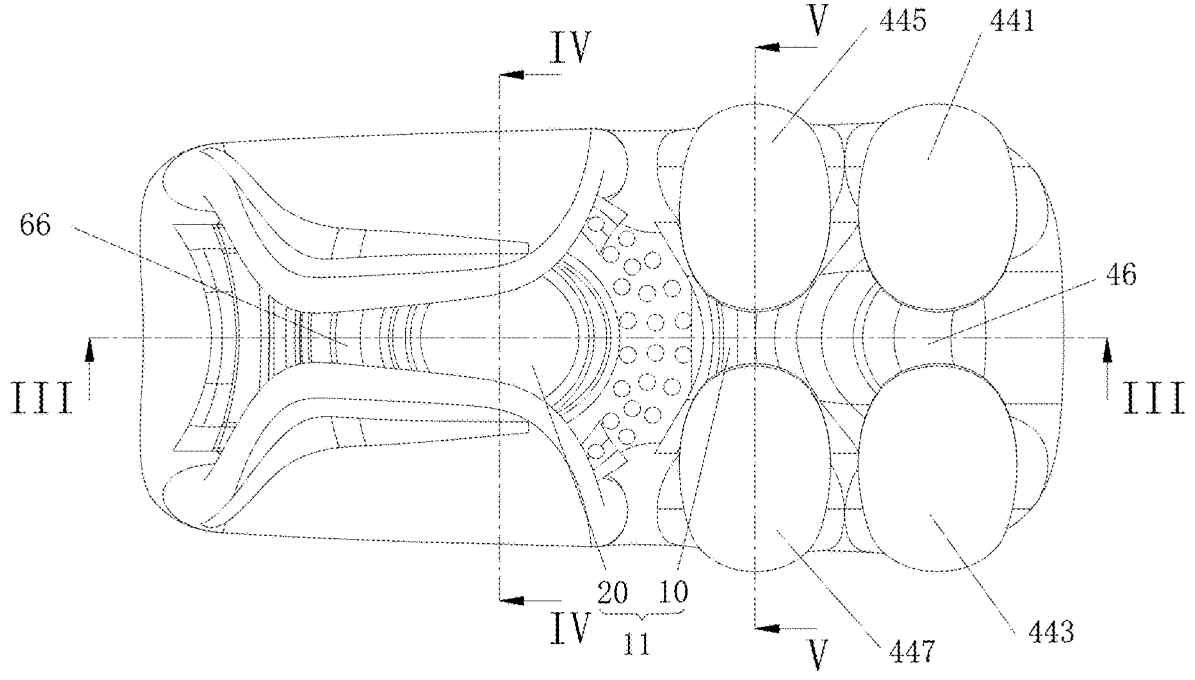
FIG. 2 is a top plan view of the sex toy of FIG. 1.

As shown in FIG. 2, the first stimulation portion 40 includes a first massage finger 441 provided on a first side and a second massage finger 443 provided on an opposite second side. The first massage finger 441 and the second massage finger 443 cooperatively enclose a first cavity 10. The second stimulation portion 60 is provided at one end of the first stimulation portion 40 and provided with a second cavity 20. The first cavity 10 and the second cavity 20 are communicated with each other to collectively form a stimulation chamber 11 for accommodating the male penis.

In the context, the longitudinal direction of the stimulation chamber 11, i.e., the direction from the first cavity 10 to the second cavity 20 is defined as the longitudinal or axial direction of the sex toy 100.

Figure 5:
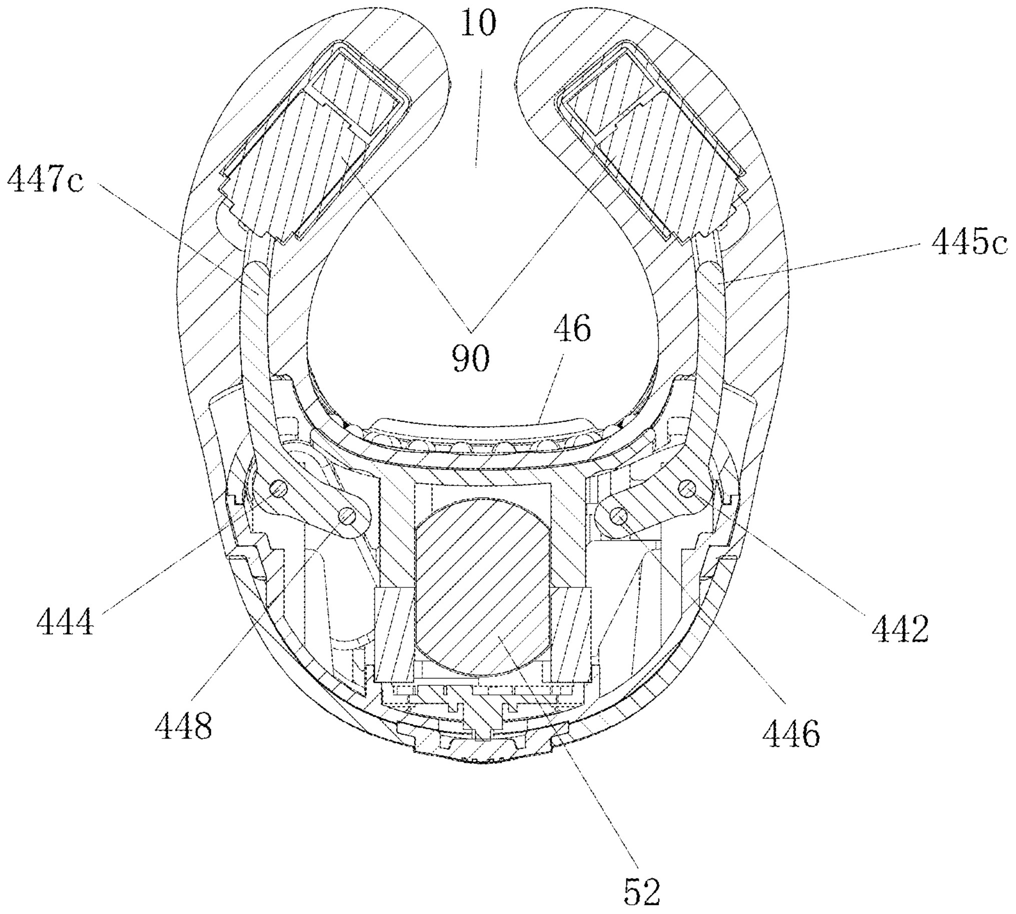
FIG. 5 is a cross sectional view of the sex toy taken along line V-V of FIG. 2.
Figure 6:
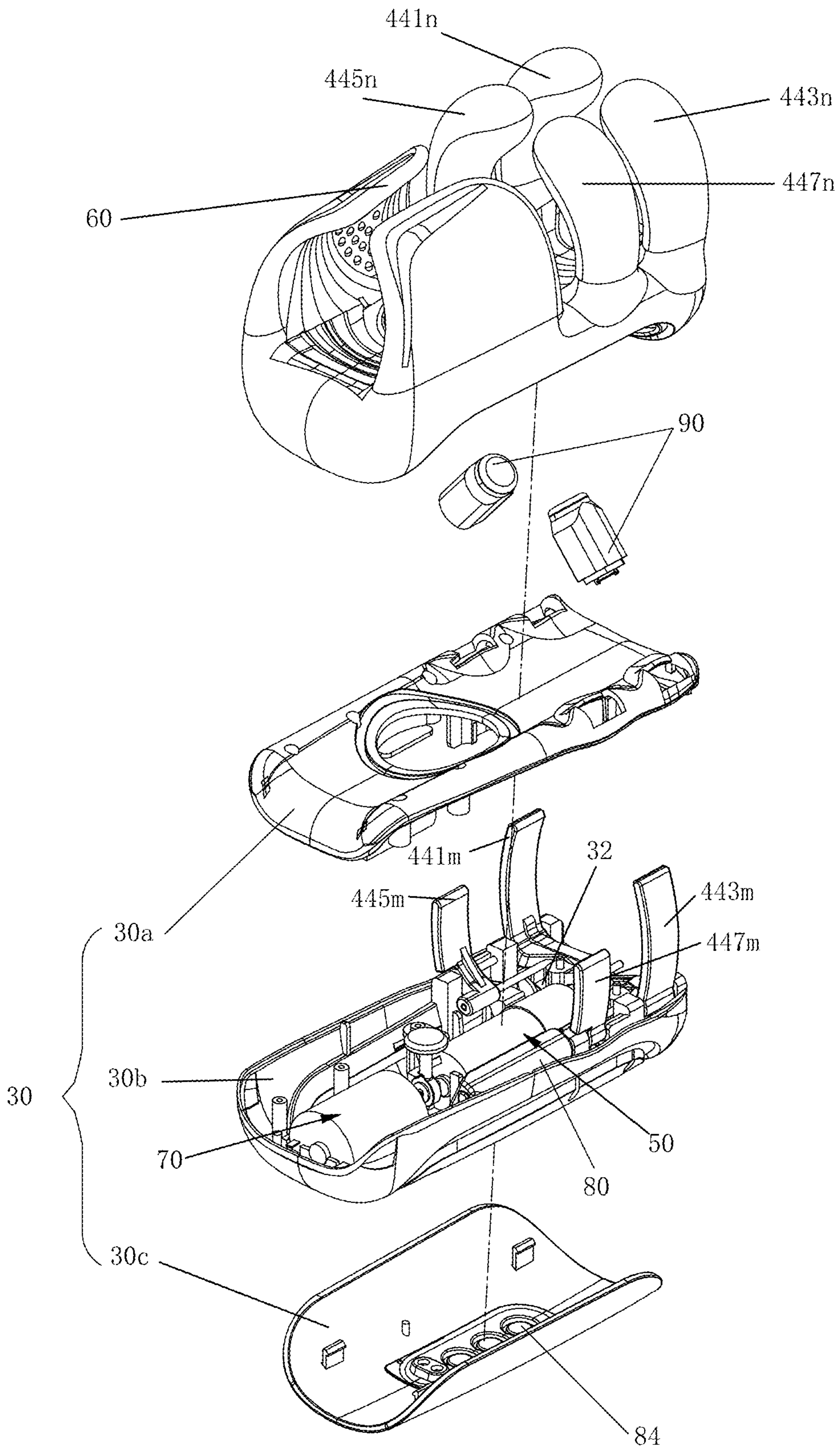
FIG. 6 is an isometric, exploded view of the sex toy of FIG. 1.
Figure 7:
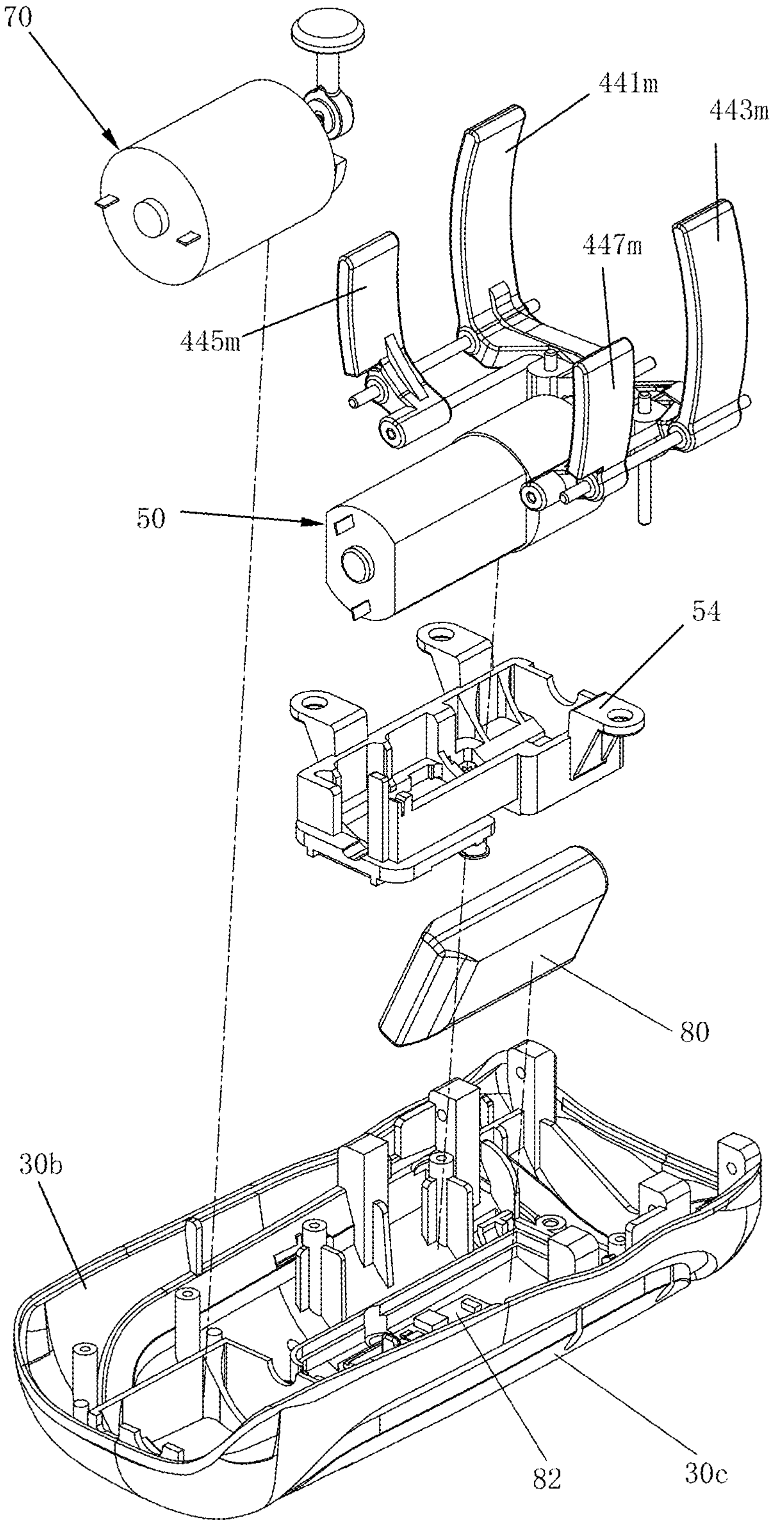
FIG. 7 is a further exploded view of the sex toy of FIG. 1, wherein an upper shell and a bottom cover are removed for clarity.

As shown in FIG. 5 and FIG. 6, the vibration member 90 is provided in the first stimulation portion 40 to generate high-frequency vibration stimulation for the male penis placed between the first massage finger 441 and the second massage finger 443. In the present embodiments, there are two vibration members 90, and each vibration member 90 is positioned adjacent to the end of a corresponding massage finger. It is understood that the number of vibration members 90 may be one or more depending on actual use. In some embodiments, a single vibration member 90 is provided in one of the massage fingers. For example, the vibration member 90 can be arranged in either the first massage finger 441 or the second massage finger 443. In other embodiments, a plurality of vibration members 90 can be arranged in one or more massage fingers, or each massage finger is equipped with one vibration member 90.

The sex toy 100 according to the embodiments of the present application includes the flexible first stimulation portion 40 with the first cavity 10 and the flexible second stimulation portion 60 with the second cavity 20. The first cavity 10 and the second cavity 20 are communicated and collectively form the stimulation chamber 11 for accommodating the male penis. During use, the male penis can be placed inside the stimulation chamber 11, and the two stimulation portions 40, 60 stimulate different areas of the male penis, providing a diversified stimulation effect and enhancing the user's pleasure.

Figure 3:
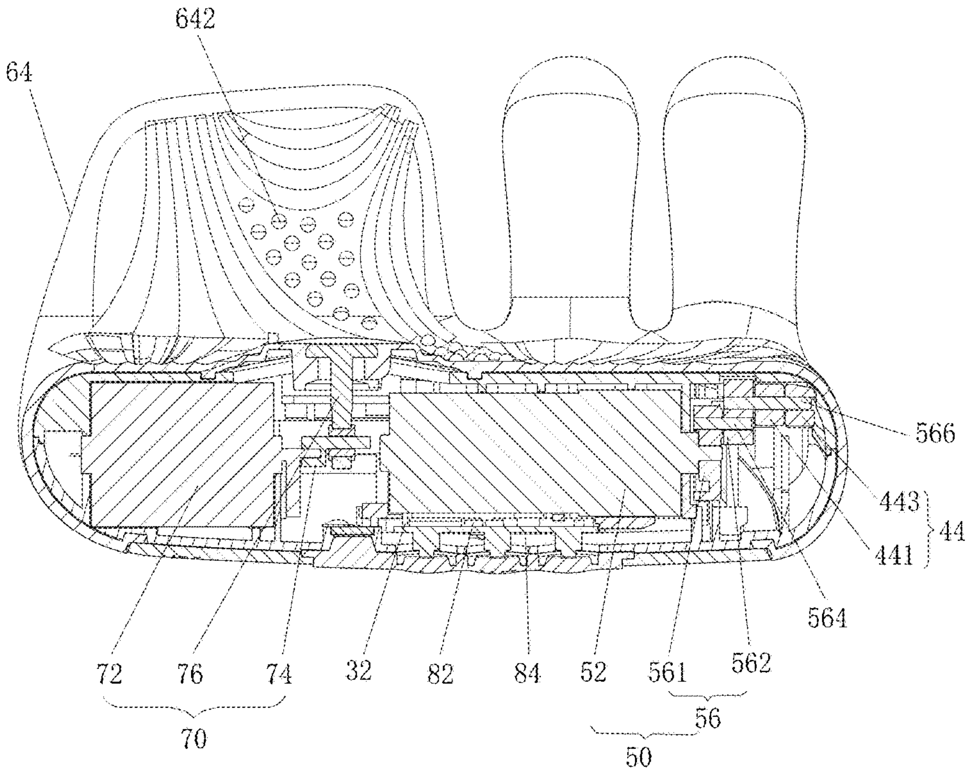
FIG. 3 is a cross sectional view of the sex toy taken along line III-III of FIG. 2.

In some embodiments, as shown in FIG. 3, the sex toy 100 may further include a first driving mechanism 50, which is used to drive the first massage finger 441 and the second massage finger 443 of the first stimulation portion 40 to move toward or away from each other, so as to change the radial size of the first cavity 10.

The first driving mechanism 50 can drive the first massage finger 441 and the second massage finger 443 to move toward or away from each other in any manner, such as translation, rotation, or movement along any path, as long as it can change the radial size of the first cavity 10.

In this embodiments, the first driving mechanism 50 is configured to drive the first massage finger 441 and the second massage finger 443 to swing toward or away from each other. When the male penis is placed in the first cavity 10, the swinging of the first massage finger 441 and the second massage finger 443 toward or away from each other can pinch the male penis and achieve a massage function.

The first stimulation portion 40 further includes a first base 46. The first massage finger 441 and the second massage finger 443 are symmetrically provided on opposite first and second sides of the first base 46. The first massage finger 441 extends toward the second side, the second massage finger 443 extends toward the first side, and the first massage finger 441 and the second massage finger 443 cooperatively enclose a first cavity 10. Preferably, the first massage finger 441 curvedly extends toward the second side, and the second massage finger 443 curvedly extends toward the first side.

Figure 1:
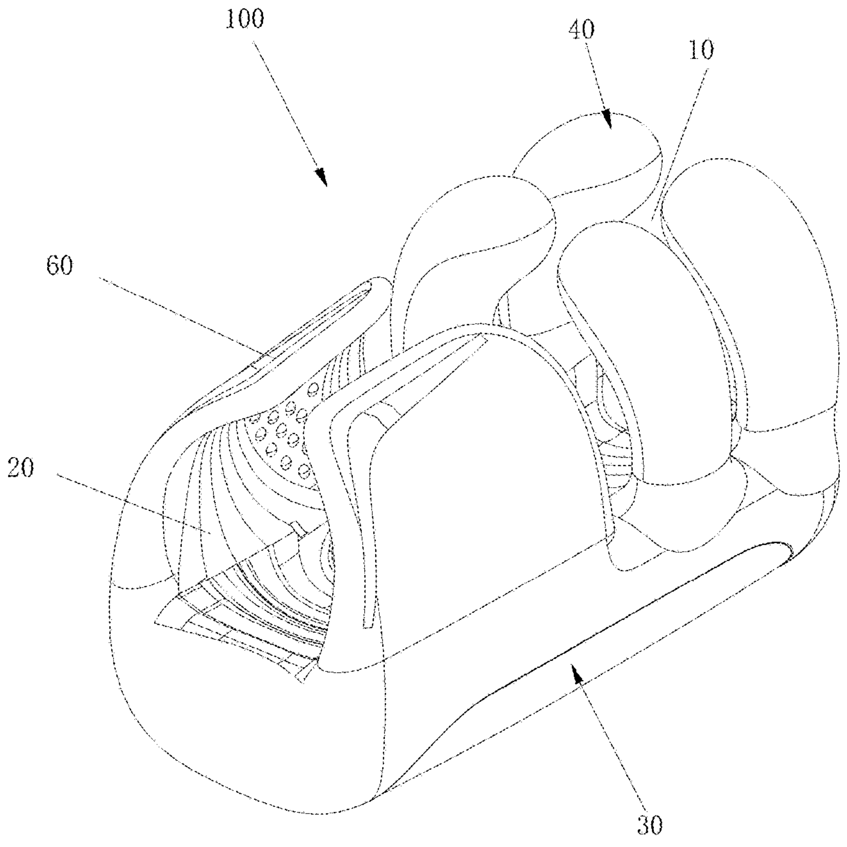
FIG. 1 is an isometric, assembled view of a sex toy according to a first embodiment of the present application.

As shown in FIG. 1, the first massage finger 441 and the second massage finger 443 are curved rods that protrude outward from the first cavity 10. In some embodiments, the first massage finger 441 and the second massage finger 443 are elongated in shape. The first massage finger 441 and the second massage finger 443, respectively positioned on two sides of the first base 46 cooperatively enclose a substantially cylindrical first cavity 10.

It should be understood that as the bending direction and curvature of the fingers vary, the shape of the enclosed first cavity 10 will correspondingly vary. In case that the fingers are in a curved or elliptical shape, the radial cross-section of the first cavity 10 will be substantially cylindrical or substantially elliptical in shape.

In some embodiments, the massage fingers are generally configured to resemble the shape of human fingers, with the first base 46 corresponding to the human palm, and the first massage finger 441 and the second massage finger 443 corresponding to two fingers extending from the palm. The swinging of the first massage finger 441 and the second massage finger 443 toward or away from each other simulates the pinching action of fingers, enhancing the user's pleasure.

Each massage finger includes a supporting member and a soft layer arranged or wrapped around the supporting member. The soft layer can be made of soft materials such as resin or rubber. In these embodiments, the soft layer is a flexible sleeve mounted around the supporting member. It can be understood that in other embodiments, this soft layer may also be attached to the side wall of the supporting member facing the first cavity 10.

Figure 4:
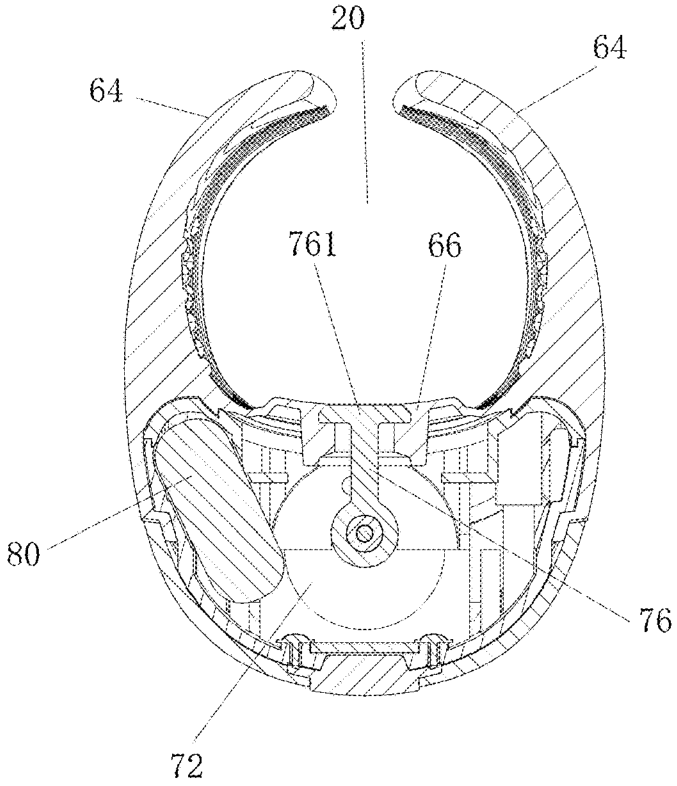
FIG. 4 is a cross sectional view of the sex toy taken along line IV-IV of FIG. 2.

As shown in FIG. 3 and FIG. 4, the second stimulation portion 60 includes a second base 66 and two arc-shaped pieces 64 provided on opposite sides of the second base 66. The middle portion of the arc-shaped piece 64 protrudes outward relative to the second cavity 20. The arc-shaped pieces 64 cooperatively enclose a substantially cylindrical second cavity 20. Similar to the massage fingers, the arc-shaped pieces 64 can also be configured into any other shape, and the length of the arc-shaped pieces 64 in the axial direction of the sex toy 100 can be designed as needed. The first cavity 10 and the second cavity 20 are arranged in the axial direction of the sex toy 100 one after another. The second base 66 is integrally connected to the first base 46. Alternatively, the second base 66 and the first base 46 can be provided as separate components that are connected together, for example, by snap-fitting or adhesive.

In these embodiments, each arc-shaped piece includes a supporting plate and a flexible layer covering the perimeter of the supporting plate. The flexible layer can be made of soft materials such as resin or rubber. In these embodiments, the flexible layer is wrapped around the supporting plate. It can be understood that in other embodiments, the flexible layer may also be attached solely to the side wall of the supporting plate facing the second cavity 20. In some embodiments, the soft layers of all massage fingers and the flexible layers of all arc-shaped pieces are integrally connected, preferably molded together by injection molding.

In these embodiments, several massage protrusions 642 or textures are provided on the inner wall of the arc-shaped pieces 64 surrounding the second cavity 20, which can further stimulate the male penis.

In some embodiments, the arc-shaped pieces 64 are fixed relative to the second base 66. The second base 66 is either integrally molded with the arc-shaped pieces 64 or fixedly connected to the arc-shaped pieces 64 by any other means, preventing relative movement between the second base 66 and the arc-shaped pieces 64, or just allowing only minor relative movements under external forces or vibrations.

In other embodiments, the arc-shaped pieces 64 may be rotatably connected to the second base 66. Specifically, the arc-shaped pieces 64 can rotate around the second base 66 by a certain angle. Generally, the rotation angle is less than 90°, but it can also be any other angle. The arc-shaped pieces 64 on both sides can rotate toward or away from each other, achieving a clamping motion between the two arc-shaped pieces 64, which can pinch the male penis within the second cavity 20.

In yet other embodiments, the arc-shaped pieces 64 can move axially relative to the second base 66, moving away from or closer to the first stimulation portion 40. In that case, the massage protrusions 642 and textures formed on the arc-shaped pieces 64 provide frictional stimulation to the male penis. It should be understood that one or more vibrating units may further be included within the arc-shaped pieces 64 to provide vibrating stimulation to the male penis. The specific implementation can be set according to actual circumstances, and it will not be limited in the present application.

In these embodiments, the first massage finger 441 and the second massage finger 443 constitute a swinging unit 44. The swinging unit 44 and the arc-shaped pieces 64 are arranged along the axial direction of the stimulation chamber 11. Since the shape of the first cavity 10 is defined by the shapes of the first massage finger 441 and the second massage finger 443, and the shape of the second cavity 20 is defined by the shape of the arc-shaped pieces 64, the shapes and sizes of the first cavity 10 and the second cavity 20 can be the same or different.

In some embodiments, the first cavity 10 and the second cavity 20 can be cylindrical, elliptical, or any other shape. The sizes of the first cavity 10 and the second cavity 20 can be set according to the size of the male penis. The lengths of the first cavity 10 and the second cavity 20 can also be the same or different, depending on specific circumstances.

The first cavity 10 and the second cavity 20 are communicated, and the stimulation chamber 11 has openings at both ends, or with one end closed and one end open. For example, one end of the second cavity 20 away from the first cavity 10 is closed, and this closed end is equipped with one or more stimulating elements, such as a vibrating stimulating element. Alternatively, one end of the first cavity 10 away from the second cavity 20 is closed, and this closed end is equipped with one or more stimulating elements, such as a vibrating stimulating element. In the embodiment as shown in FIG. 1, the stimulation chamber 11 formed by the first cavity 10 and the second cavity 20 has openings at both ends.

In some embodiments, the sex toy 100 may further include a second driving mechanism 70, which is used to drive the second stimulation portion 60 to achieve the same or different stimulation functions as the first stimulation portion 40. In some embodiments, the second driving mechanism 70 can drive the second stimulation portion 60 to perform at least one movement of the following: swinging, telescoping, radial tapping, rotating, and vibrating. For example, the second stimulation portion 60 can be driven to perform a single motion of the following: swing, telescope, perform radial tapping, rotate, and vibrate. Furthermore, the second stimulation portion 60 can be driven to vibrate while performing one of the following: swinging, telescoping, radial tapping, and rotating. In some embodiments, the second stimulation portion 60 can be driven to perform any combination of three or more types of movement simultaneously. The movement modes of the second stimulation portion 60 are not limited in the present application.

The first driving mechanism 50 and the second driving mechanism 70 are arranged corresponding to the first stimulation portion 40 and the second stimulation portion 60 respectively. Specifically, in these embodiments, the first driving mechanism 50 is provided on one side of the first stimulation portion 40 away from the first cavity 10, and the second driving mechanism 70 is provided on one side of the second stimulation portion 60 away from the second cavity 20.

In some embodiments, the sex toy has a housing 30, which can be made of a rigid material, such as plastic or metal, providing support for the driving mechanisms. Both the first driving mechanism 50 and the second driving mechanism 70 are housed within the housing 30, The first base 46 of the first stimulation portion 40 and the second base 66 of the second stimulation portion 60 cover the housing 30.

Specifically, as shown in FIG. 6, in these embodiments, the first massage finger 441 includes a first supporting member 441*m* and a first flexible sleeve 441*n* mounted around the outer periphery of the first supporting member 441*m*. The second massage finger 443 includes a second supporting member 443*m* and a second flexible sleeve 443*n* mounted around the outer periphery of the second supporting member 443*m*.

As shown in FIG. 6, the housing 30 includes an upper shell 30*a*, a lower shell 30*b*, and a bottom cover 30*c* arranged one below another and detachably connected to each other, for example, through snap-fitting connections. An installation space 32 is defined between the connected upper shell 30*a* and lower shell 30*b*. The first base 46 of the first stimulation portion 40 and the second base 66 of the second stimulation portion 60 cover the upper shell 30*a*. The first driving mechanism 50 and the second driving mechanism 70 are housed within the installation space 32. The upper shell 30*a* has through holes corresponding to the first massage finger 441 and the second massage finger 443. The supporting members of both the first massage finger 441 and the second massage finger 443 extend out of the housing 30 through the through holes of the upper shell 30*a*.

Figure 8:
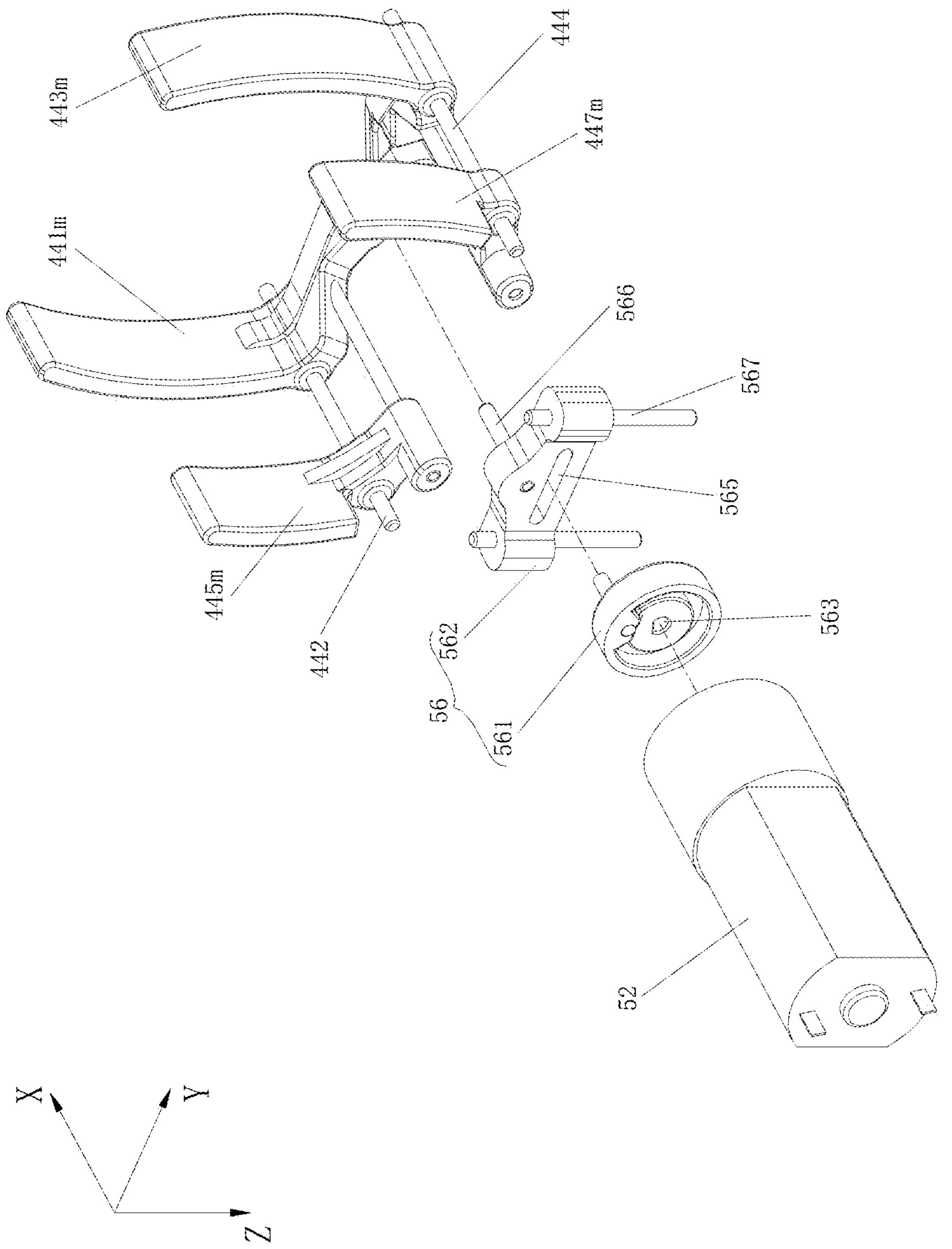
FIG. 8 is a further exploded view of a first stimulation portion of the sex toy of FIG. 1.
Figure 8A:
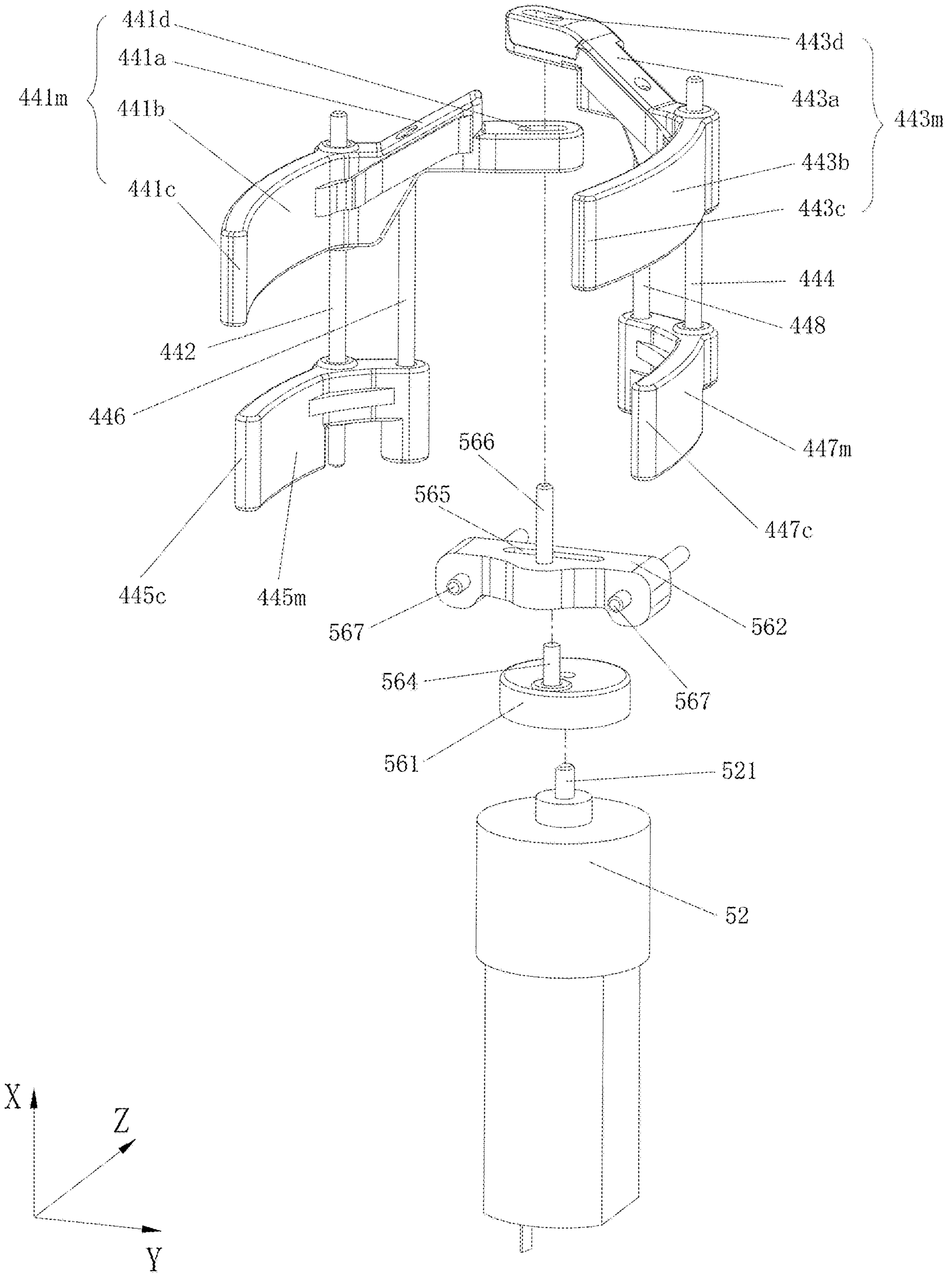
FIG. 8*a* shows the first stimulation portion of FIG. 8 from another aspect.

As shown in FIG. 8 and FIG. 8*a*, the first driving mechanism 50 includes a first motor 52 and a transmission unit 56 connected between the first motor 52 and the swinging unit 44. The first motor 52 of the first driving mechanism 50 is mounted in the installation space 32 through an installation seat 54. When the first motor 52 works, the first massage finger 441 and the second massage finger 443 are driven to swing relative to the first base 46, moving closer to or away from each other, thereby achieving a pinching function to knead the male penis accommodated between the first massage finger 441 and the second massage finger 443.

The first supporting member 441*m* includes a first connecting arm 441*a* and a first swinging arm 441*b* which are connected to each other. Preferably, the first connecting arm 441*a* and the first swinging arm 441*b* are integrally formed as one piece, and an included angle is set therebetween. A joint portion of the first connecting arm 441*a* and the first swinging arm 441*b* is rotatably connected to the lower shell 30*b* of the housing 30 by a first pivot 442. A distal end of the first connecting arm 441*a* away from the first swinging arm 441*b* is connected to the transmission unit 56, and a distal end of the first swinging arm 441*b* away from the first connecting arm 441*a* is configured as a first swinging end 441*c*.

Similarly, the second supporting member 443*m* includes a second connecting arm 443*a* and a second swinging arm 443*b* which are connected to each other and angled with each other. A joint portion of the second connecting arm 443*a* and the second swinging arm 443*b* is rotatably connected to the lower shell 30*b* of the housing 30 by a second pivot 444. A distal end of the second connecting arm 443*a* away from the second swinging arm 443*b* is connected to the transmission unit 56, and a distal end of the second swinging arm 443*b* away from the second connecting arm 443*a* is configured as a second swinging end 443*c*. The distal ends of the first connecting arm 441*a* and the second connecting arm 443*a* can move along a first direction, such as Z-direction, and thus the first swinging arm 441*b* can swing about the first pivot 442, and the second swinging arm 443*b* can swing about the second pivot 444.

The first pivot 442 and second pivot 444 both extend along a second direction, such as X-direction, being parallel to and spaced from each other. The first swinging end 441*c* and the second swinging end 443*c* are opposite to each other in a third direction, such as Y-direction. During operation, the first motor 52 drives the distal ends of the first connecting arm 441*a* and the second connecting arm 443*a* to do reciprocating movement synchronously in the Z-direction through the transmission unit 56, making the first massage finger 441 swing about the first pivot 442 and the second massage finger 443 swing about the second pivot 444, thereby the first swinging end 441*c* and second swinging end 443*c* swinging towards or away from each other to achieve the pinching action.

In these embodiments, the first stimulation portion 40 further includes a third massage finger 445 and a fourth massage finger 447, which are provided approximately symmetrically at two sides of the first cavity 10. Similar to the first massage finger 441 and the second massage finger 443, the third massage finger 445 includes a third supporting member 445*m* and a third flexible sleeve 445*n*, and the fourth massage finger 447 includes a fourth supporting member 447*m* and a fourth flexible sleeve 447*n*.

The first pivot 442 extends through a central portion of the third supporting member 445*m* to rotatably connect the third massage finger 445 to the housing 30, and the second pivot 444 extends through a central portion of the fourth supporting member 447*m* to rotatably connect the fourth massage finger 447 to the housing 30. The first pivot 442 can be fixedly connected to the first supporting member 441*m* of the first massage finger 441 and the third supporting member 445*m* of the third massage finger 445, at the same time, the first pivot 442 is rotatably connected to the housing 30, thereby to achieve synchronized rotation relative to the housing 30. Alternatively, the first pivot 442 may be fixed to the housing 30, and the first supporting member 441*m* and the third supporting member 445*m* are rotatably mounted around the first pivot 442.

The second pivot 444 can be fixedly connected to the second supporting member 443*m* of the second massage finger 443 and the fourth supporting member 447*m* of the fourth massage finger 447, at the same time, the second pivot 444 is rotatably connected to the housing 30, thereby to achieve synchronized rotation relative to the housing. Alternatively, the second pivot 444 may be fixed to housing 30, and the second supporting member 443*m* and the fourth supporting member 447*m* are rotatably mounted around the second pivot 444.

In these embodiments, the first flexible sleeve 441*n*, the second flexible sleeve 443*n*, the third flexible sleeve 445*n*, and the fourth flexible sleeve 447*n* are integrally connected. All of them are also integrally connected to the flexible outer layer of the arc-shaped pieces 64.

The third supporting member 445*m* has one end configured as a third swinging end 445*c*, and another end being fixedly connected to the first connecting arm 441*a* of the first massage finger 441 by a third pivot 446, thereby the third massage finger 445 can swing about the first pivot 442 together with the first massage finger 441. The fourth massage finger 447 has one end configured as a fourth swinging end 447*c*, and another end being fixedly connected to the second connecting arm 443*a* of the second massage finger 443 by a fourth pivot 448, thereby the fourth massage finger 447 can swing about the second pivot 444 together with the second massage finger 443. The third swinging end 445*c* and the fourth swinging end 447*c* are opposite to each other in the Y-direction, which can swing towards or away from each other to achieve a pinching action.

In these embodiments, the first massage finger 441, the second massage finger 443, the third massage finger 445, and the fourth massage finger 447 of the first stimulation portion 40 can be shaped like four fingers. These four fingers serve as the four massage fingers of the sex toy 100, including the four swinging ends 441*c*, 443*c*, 445*c*, and 447*c*. During operation, the fingers swing along with the swinging ends 441*c*, 443*c*, 445*c*, and 447*c*, kneading the male penis accommodated between the fingers.

Figure 9:
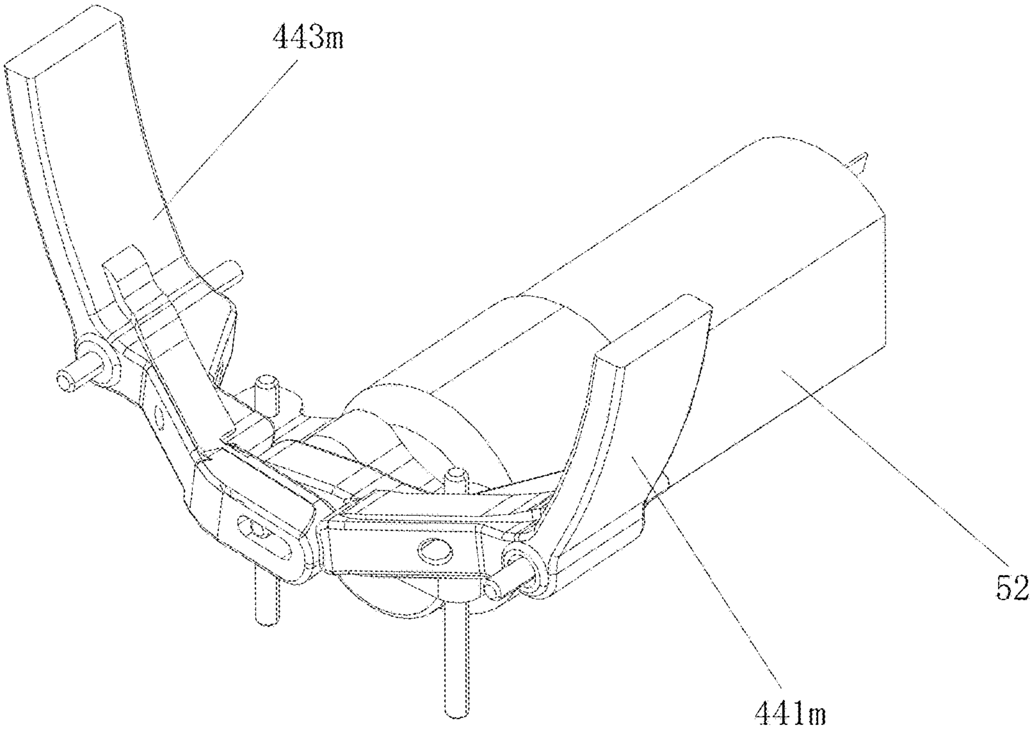
FIG. 9 is a schematic view of a second embodiment of the first stimulation portion.
Figure 9A:
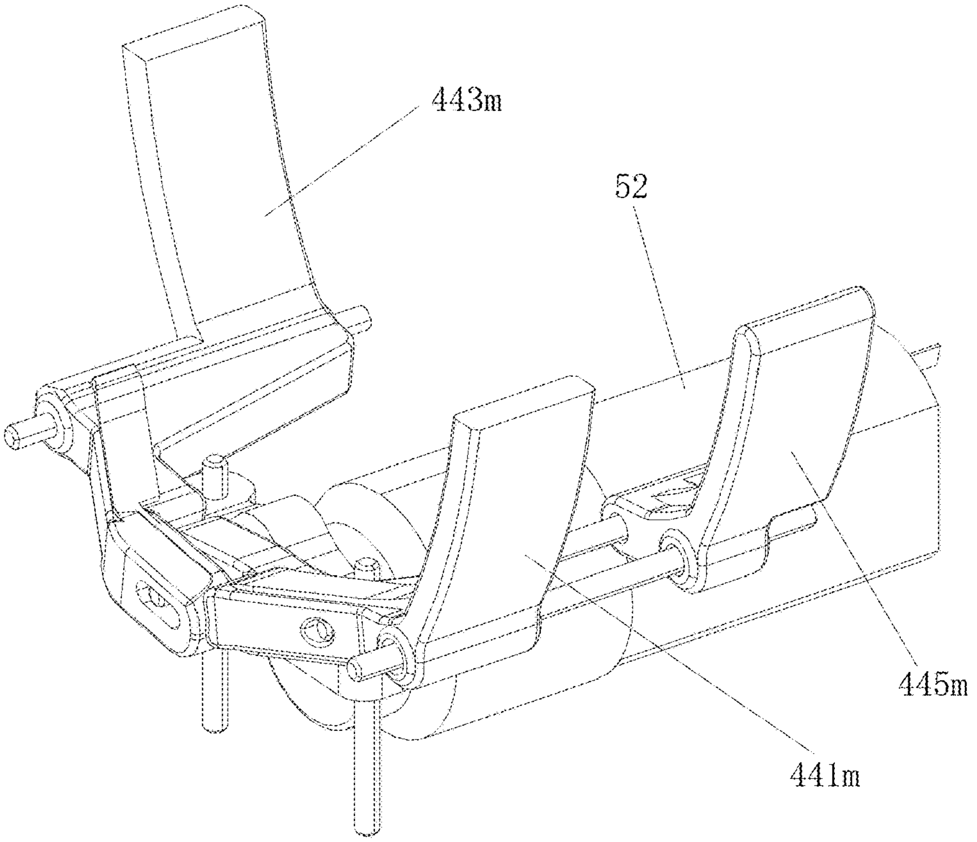
FIG. 9*a* is a schematic view of a third embodiment of the first stimulation portion.
Figure 9B:
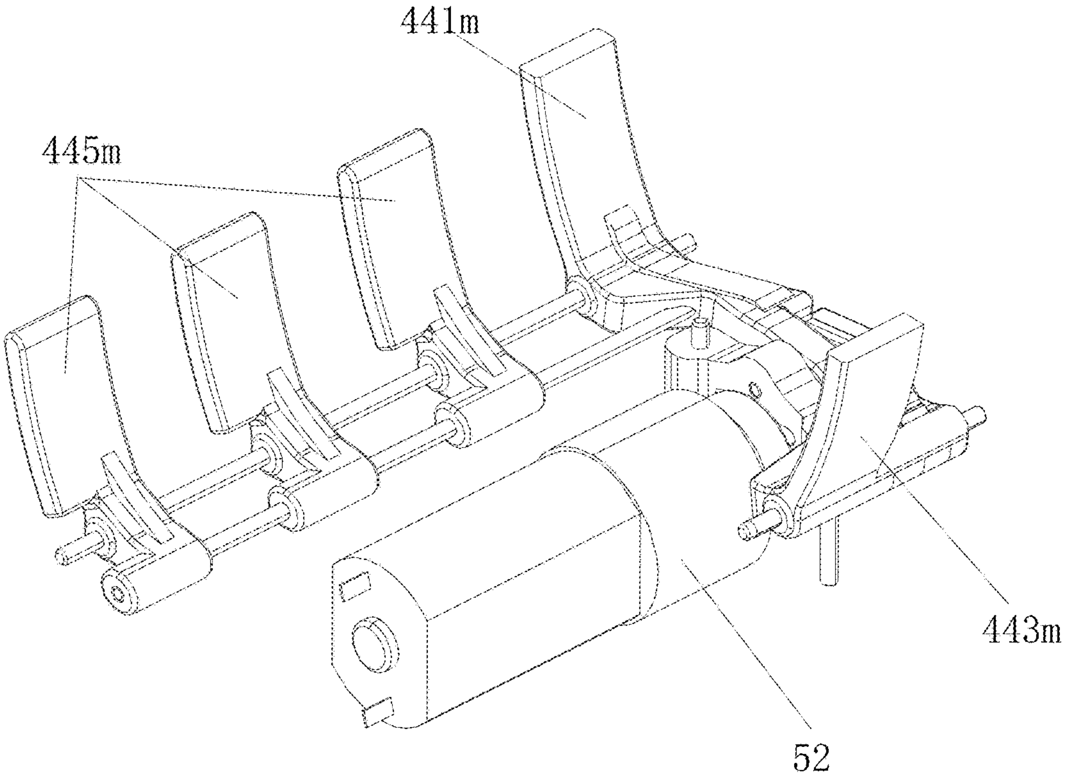
FIG. 9*b* is a schematic view of a fourth embodiment of the first stimulation portion.
Figure 9C:
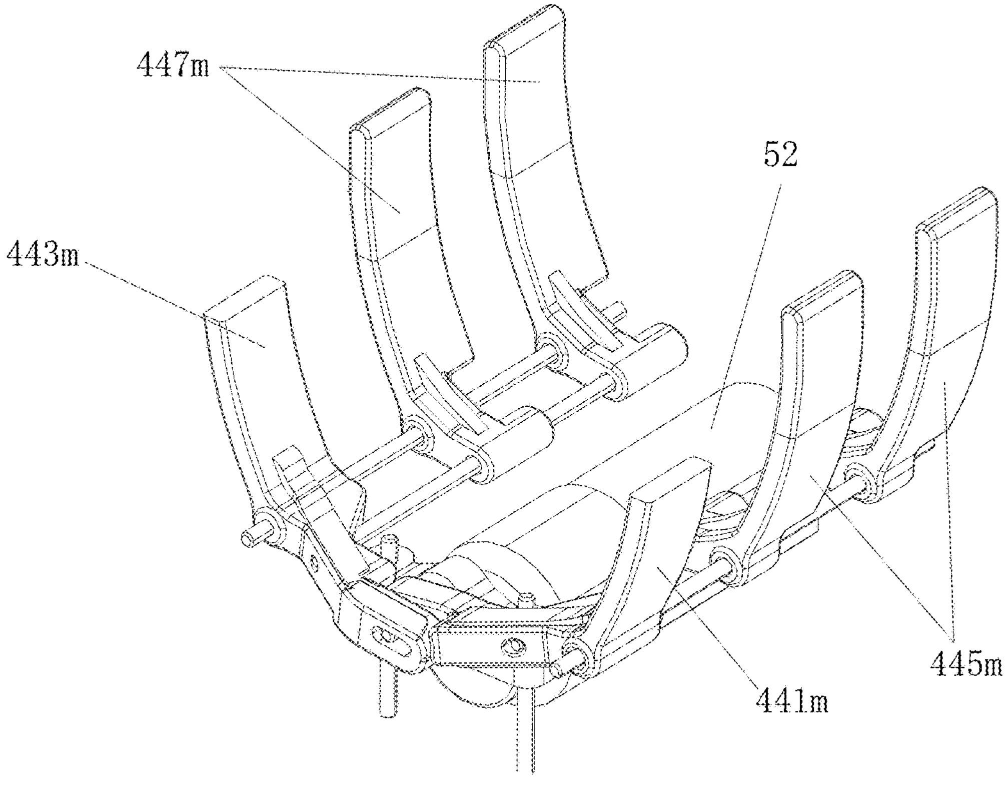
FIG. 9*c* is a schematic view of a fifth embodiment of the first stimulation portion.

It should be understood that the number of massage fingers is preferably multiple, such as two, three, four, six, eight, etc., and is not limited to the specific embodiments. FIG. 9 shows a sex toy 100 with two massage fingers, where the first massage finger 441 and the second massage finger 443 are provided approximately symmetrically along the Y direction. FIG. 9*a* shows a sex toy 100 with three massage fingers, where the second massage finger 443 is positioned on one side, while the other two massage fingers, the first massage finger 441 and the third massage finger 445, are located on the opposite side. The three massage fingers provided in an interleaved manner along the X direction. FIG. 9*b* shows a sex toy 100 with five massage fingers, where the second massage finger 443 is on one side, and the other four massage fingers: a first massage finger 441 and three third massage fingers 445, are positioned on the opposite side. FIG. 9*c* shows a sex toy 100 with six massage fingers, where three massage fingers are provided on each side, with one first massage finger 441 and two third massage fingers 445 on one side, and one second massage finger 443 and two fourth massage fingers 447 on the opposite side.

In these embodiments, the first motor 52 is a rotary motor, and has a first rotary shaft 521 for outputting torque. The transmission unit 56 is configured for converting rotation of the first motor 52 into reciprocating movement along the first direction, thereby driving the distal ends of the first connecting arm 441*a* and the second connecting arm 443*a* to move in the first direction. The transmission unit 56 includes a first eccentric wheel 561 and a sliding block 562.

The first eccentric wheel 561 is connected to the first rotary shaft 521 of the first motor 52. In these embodiments, the first eccentric wheel 561 is generally circular-shaped, and a central hole 563 is defined in a central portion thereof for inserting of the first rotary shaft 521 therein. The central hole 563 of the first eccentric wheel 561 is non-circular shaped, such as D-shaped, and a cross section of the first rotary shaft 521 has a shape matching with that of the central hole 563. After inserting of the first rotary shaft 521 into the central hole 563 of the first eccentric wheel 561, a relative rotation therebetween is limited by form fitting, thereby the first eccentric wheel 561 can rotate along with the first rotary shaft 521 of the first motor 52.

A first rod 564 extends outwardly from a top surface adjacent to a periphery of the first eccentric wheel 561, that is, the first rod 564 is set eccentrically on the first eccentric wheel 561. Generally, the first rod 564 is parallel to the first rotary shaft 521 of the first motor 52. During rotation of the first eccentric wheel 561 along with the first rotary shaft 521 of the first motor 52, the first rod 564 revolves round the first rotary shaft 521. In these embodiments, the first rotary shaft 521 extends along the X-direction, and the first rod 564 revolves round the first rotary shaft 521 in YZ plane. In other words, the first rod 564 generates displacements on both the Y-direction and the Z-direction under the driving of the first motor 52.

The sliding block 562 defines a sliding groove 565 therein, which is strip-shaped and elongated in the Y-direction. The first rod 564 is engages into the sliding groove 565, and is fixed relative to the sliding block 562 in the Z-direction whilst is slidable relative to the sliding block 562 in the Y-direction. During revolving of the first rod 564 around the first rotary shaft 521, its displacement in the Y-direction cannot drive the sliding block 562 to move, while its displacement in the Z-direction drives the sliding block 562 to do reciprocating movement. Thereby, rotation of the first motor 52 is converted to reciprocating liner motion of the sliding block 562 in the Z-direction.

In these embodiments, the distal end of the first connecting arm 441*a* defines a first slot 441*d* therein, and the distal end of the second connecting arm 443*a* defines a second slot 443*d* therein. A second rod 566 extends outwardly from the sliding block 562 along the X-direction, and is movably engaged into the first slot 441*d* and the second slot 443*d*, thereby the sliding block 562 can drive the distal ends of the first connecting arm 441*a* and the second connecting arm 443*a* to do reciprocating movement synchronously in the Z-direction. The first slot 441*d* and the second slot 443*d* may be strip-shaped in an extension direction of the first connecting arm 441*a* and second connecting arm 443*a*, thereby the second rod 566 having more movement allowance in the first slot 441*d* and second slot 443*d*.

In these embodiments, the sliding block 562 is movably connected to the lower shell 30*b* of the housing 30 by a fifth pivot 567 which extends along the Z-direction. The fifth pivot 567 movably extends through the sliding block 562, thereby guiding movement of the sliding block 562 in the Z-direction. Preferably, each end of the sliding block 562 in the Y-direction is provided with one fifth pivot 567, thus a movement of the sliding block 562 in the Z-direction can be more stable, and accordingly swinging of the swinging ends 441*c*, 442*c*, 445*c*, 447*c* of the swinging unit 44 driven by the second rod 566 of the sliding block 562 can be more consistent and powerful. That is to say, the stimulation intensity of each finger of the sex toy 100 is more consistent and the overall stimulation effect is better.

The number of vibration members 90 is preferably multiple, such as two, three, four, six, eight, etc., and is not limited to specific embodiments. Preferably, the vibration members 90 can be placed in some of the massage fingers, or they can be installed in each massage finger. For example, two vibration members 90 are respectively placed in the first massage finger 441 and the second massage finger 443; or based on the actual number of massage fingers, each massage finger can have one vibration member 90. For instance, FIG. 9*a* shows a sex toy 100 with three massage fingers, equipped with three vibration members 90; FIG. 9*b* shows a sex toy 100 with five massage fingers, equipped with five vibration members 90; and FIG. 9*c* shows a sex toy 100 with six massage fingers, equipped with six vibration members 90. During use, the first stimulation portion 40 can be activated separately, or the vibration members 90 can be activated separately, or both the first stimulation portion 40 and the vibration members 90 can be activated simultaneously.

Figure 10:
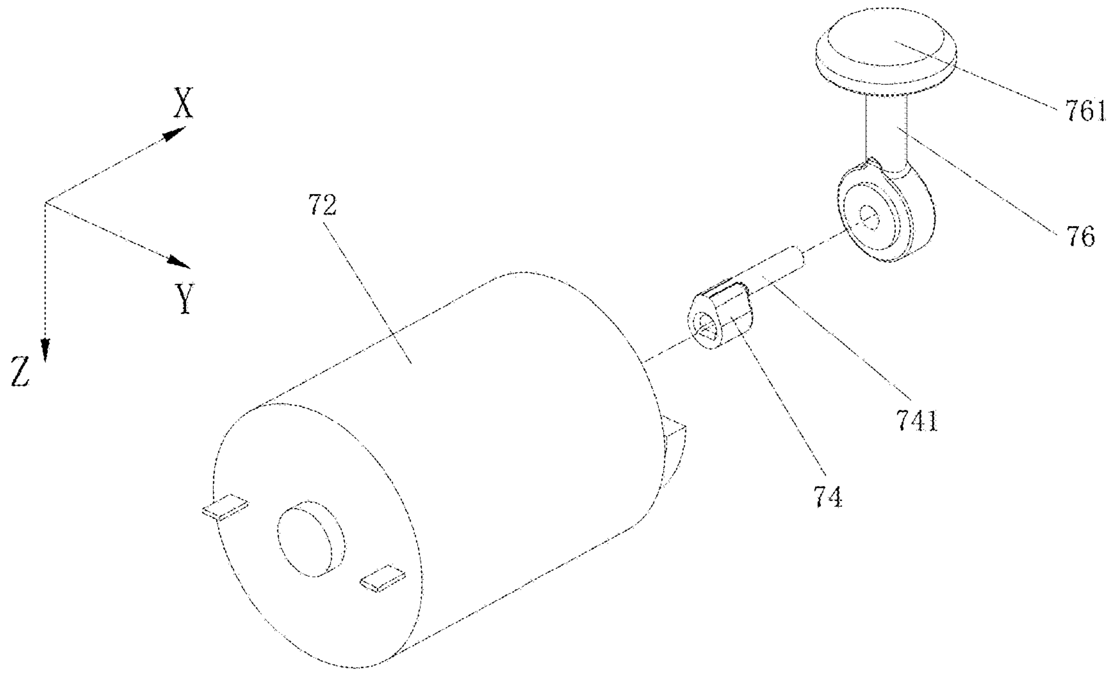
FIG. 10 is a further exploded view of a second stimulation portion of the sex toy of FIG. 1.
Figure 11:
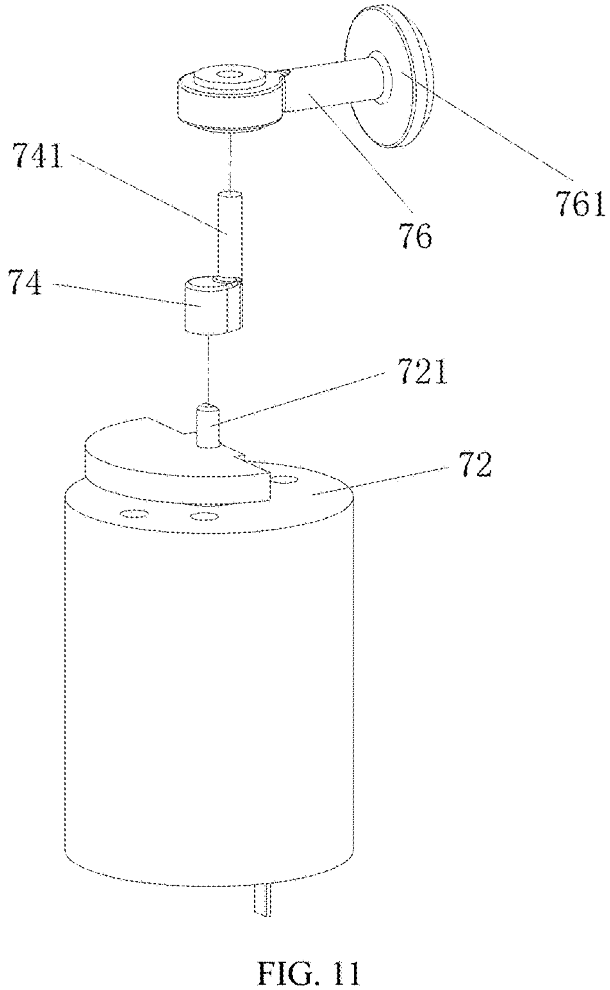
FIG. 11 shows the second stimulation portion of FIG. 10 from another aspect.

As shown in FIG. 10 and FIG. 11, the second driving mechanism 70 includes a second motor 72 with a second rotary shaft 721, a second eccentric wheel 74 connected to the second rotary shaft 721 of the second motor 72, and a swinging rod 76 connected to the second eccentric wheel 74. The second eccentric wheel 74 has a third rod 741 extending out therefrom, and the third rod 741 is parallel to the second rotary shaft 721 of the second motor 72. The swinging rod 76 is generally perpendicular to the third rod 741, with one end thereof being rotatably mounted around the third rod 741 and another end thereof embedded into the housing 30 and the second base 66. Preferably, a head 761 with a diameter larger than other portions of the swinging rod 76 is formed at the another end of the swinging rod 76, and the housing 30 and the second base 66 are provided with openings at corresponding positions to allow the head 761 to extend and retract, thereby improving a stability of the connection between the swinging rod 76 and the housing 30.

Referring also to FIG. 3 and FIG. 4, the second rotary shaft 721 of the second motor 72 and the third rod 741 of the second eccentric wheel 74 both extend along the X-direction, and the swinging rod 76 extends along the Z-direction. During operation, rotation of the second motor 72 is converted into revolving of the swinging rod 76 about the second rotary shaft 721, and then converted into reciprocating movement in the Z-direction of the head 761 of the swinging rod 76 since the swinging rod 76 is limited to move in the X-direction and Y-direction for the engagement with the housing 30. At the same time, a relative rotation is generated between the swinging rod 76 and the third rod 741. That is, the second stimulation portion 60 provides reciprocating motion in the Z-direction to tap a part of the male penis nestled to the head 761.

The first stimulation portion 40 and the second stimulation portion 60 can provide stimulation to different parts of the male penis in various ways, providing better stimulation effects. It should be understood that the first stimulation portion 40 and the second stimulation portion 60 can be activated separately, or the first stimulation portion 40 and the second stimulation portion 60 can be used simultaneously.

Referring to FIG. 3 to FIG. 7 again, a battery 80, preferably a rechargeable battery, is arranged in the housing 30 for supplying electric power to electric components, such as the vibration member 90, the first motor 52 and the second motor 72 of the sex toy 100. Further, a control circuit board 82 is mounted in the housing 30 and electrically connected to the vibration member 90, the first motor 52 and the second motor 72 for controlling their operation according to user's instructions, such as controlling the vibration frequency of the vibration member 90, controlling the rotary speed of the first motor 52 and the second motor 72, and etc. Control buttons 84, such as mechanical buttons or touch buttons, may be provided on the bottom cover 30*c* for input the user's instructions.

Figure 12:
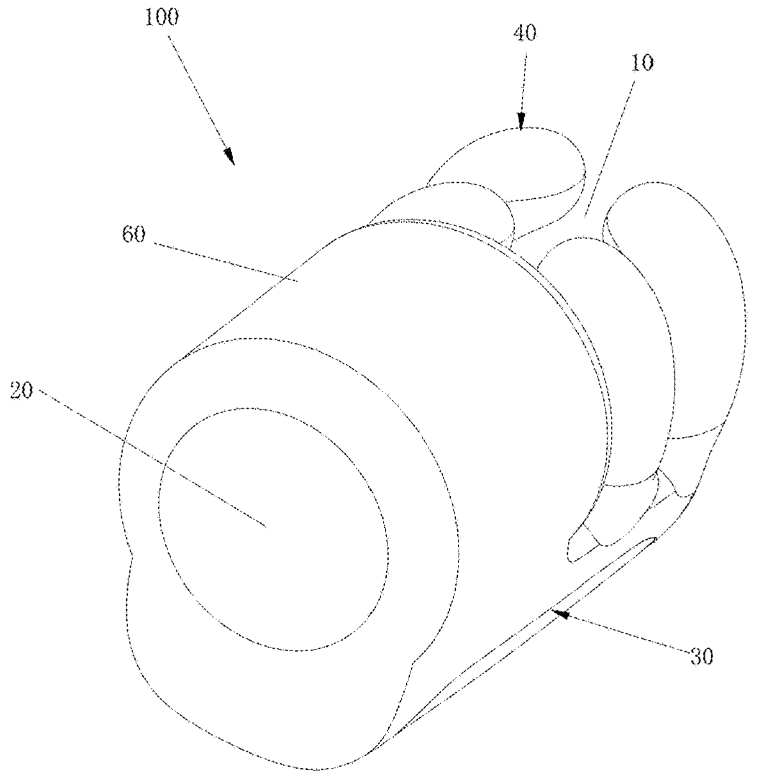
FIG. 12 is an isometric, assembled view of a sex toy according to a second embodiment of the present application.
Figure 13:
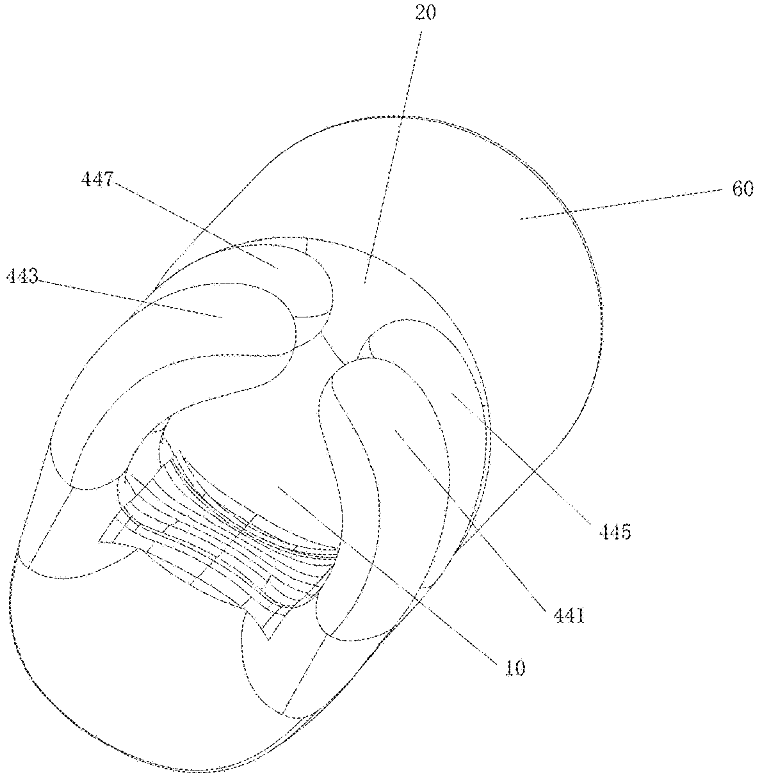
FIG. 13 shows the sex toy of FIG. 12 from another aspect.

FIG. 12 and FIG. 13 illustrate the sex toy 100 according to the second embodiment of the present application. This embodiment is similar to the previous embodiment, for the same components, please refer to the description of the previous embodiments. The present embodiment differs from the first embodiment in the shape of the second stimulation portion 60. Specifically, in this embodiment, the second stimulation portion 60 is round cylindrical. The round cylindrical second stimulation portion 60 defines a round cylindrical second cavity 20. One end of the second stimulation portion 60 adjacent to the first stimulation portion 40 is opened and the other end away from the first stimulation portion 40 is closed. It should be understood that, in other embodiments, the end of the second stimulation portion 60 away from the first stimulation portion 40 may also be opened.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A sex toy, comprising:

a flexible first stimulation portion, comprising a first massage finger provided on a first side and a second massage finger provided on a second side opposite to the first side, wherein the first massage finger extends toward the second side, the second massage finger extends toward the first side, and the first massage finger and the second massage finger cooperatively enclose a first cavity;

a vibration member provided at the flexible first stimulation portion; and a flexible second stimulation portion, provided at one end of the first stimulation portion and provided with a second cavity, wherein the first cavity is communicated with the second cavity to collectively form a stimulation chamber for accommodating a male penis, and wherein the first massage finger comprises a first concave wall extending curvedly in a circumferential direction of the first cavity, the second finger comprises a second concave wall extending curvedly in the circumferential direction of the first cavity, the first concave wall and the second concave wall cooperatively enclose the first cavity, and both the first curved concave wall and the second curved concave wall are configured to contact the male penis when the male penis is accommodated in the stimulation chamber.

2. The sex toy according to claim 1, further comprising a first driving mechanism configured to drive the first massage finger and the second massage finger to move toward or away from each other, thereby changing a radial size of the first cavity.

3. The sex toy according to claim 2, wherein the first driving mechanism is configured to drive the first massage finger and the second massage finger to swing toward or away from each other.

4. The sex toy according to claim 3, wherein the first massage finger and the second massage finger constitute a swinging unit, the first driving mechanism comprises a first motor and a transmission unit connected between the first motor and the swinging unit, the transmission unit is configured to convert a rotational motion of the first motor into a linear reciprocating motion in a first direction to drive the first massage finger and the second massage finger to swing toward or away from each other.

5. The sex toy according to claim 4, wherein the transmission unit comprises a first eccentric wheel and a sliding block, the first eccentric wheel comprises a first rod extending along a second direction and rotatable around a first rotary shaft of the first motor under the driving of the first motor, the sliding block is defined with an elongated sliding groove extending along a third direction, and the first rod is engaged in the sliding groove for driving the sliding block to move in the first direction; and wherein each of the first massage finger and the second massage finger is connected to and moving together with the transmission unit, the first massage finger and the second massage finger are rotatable about a rotary axis extending along the second direction, the second direction is perpendicular to the first direction, and the third direction is perpendicular to the first direction and the second direction.

6. The sex toy according to claim 2, further comprising a second driving mechanism configured to drive the second simulation portion to tap in a radial direction.

7. The sex toy according to claim 6, wherein the second driving mechanism comprises a second motor, a second eccentric wheel connected to a second rotary shaft of the second motor, and a swinging rod connected to the second eccentric wheel;

the second eccentric wheel extends outward with a third rod parallel to the second rotary shaft of the second motor, the second rotary shaft of the second motor extends along a second direction, the swinging rod extends along a first direction, one end of the swinging rod is rotatably connected to the third rod, and the other end of the swinging rod is embedded in the second simulation portion to achieve a tapping motion in the first direction; and the second direction is perpendicular to the first direction, and the second direction is an axial direction of the stimulation chamber which is cylindrical.

8. The sex toy according to claim 6, further comprising a housing, wherein the housing comprises an upper shell and a lower shell detachably connected to each other with an installation space defined therebetween, the first stimulation portion and the second stimulation portion cover the upper shell, and the first driving mechanism and the second driving mechanism are housed within the installation space.

9. The sex toy according to claim 8, wherein a battery is housed within the installation space to supply power to the vibration member, the first driving mechanism, and the second driving mechanism.

10. The sex toy according to claim 8, wherein the housing further comprises a bottom cover, the lower shell and the bottom cover are detachably connected, and a control circuit board housed within the installation space and control buttons provided on the bottom cover are configured to control the vibration member, the first driving mechanism, and the second driving mechanism.

11. The sex toy according to claim 1, wherein the first stimulation portion further comprises a first base, the first massage finger and the second massage finger are symmetrically provided on opposite sides of the first base, and the first cavity enclosed by the first concave wall of the first massage finger, the second concave wall of the second massage finger, and a wall of the first base facing the first cavity is cylindrical;

and wherein the wall of the first base facing the first cavity contacts the male penis when the male penis is accommodated in the stimulation chamber.

12. The sex toy according to claim 11, wherein the second stimulation portion comprises a second base and arc-shaped pieces respectively provided on opposite sides of the second base, the second base is integrally connected to the first base, and the second cavity enclosed by a wall of the second base facing the second cavity and walls of the arc-shaped pieces facing the second cavity is cylindrical;

and wherein the wall of the second base facing the second cavity and the walls of the arc-shaped pieces facing the second cavity contact the male penis when the male penis is accommodated in the stimulation chamber.

13. The sex toy according to claim 12, wherein the first base and the second base are provided one after another along an axial direction of the stimulation chamber.

14. The sex toy according to claim 12, wherein the arc-shaped pieces are fixedly connected to the second base.

15. The sex toy according to claim 12, wherein an inner wall of the arc-shaped pieces encircling the second cavity is provided with a plurality of massage protrusions.

16. The sex toy according to claim 1, wherein the first massage finger and the second massage finger are elongated and curved rods.

17. The sex toy according to claim 1, wherein the second stimulation portion is round cylindrical, the second cavity defined by the round cylindrical second stimulation portion is round cylindrical, and one end of the second stimulation portion away from the first stimulation portion is opened, and one end of the first stimulation portion away from the second stimulation portion is opened.

18. The sex toy according to claim 1, wherein the first massage finger comprises a first supporting member and a first flexible sleeve wrapped around the first supporting member, and the second massage finger comprises a second supporting member and a second flexible sleeve wrapped around the second supporting member, the second stimulation portion comprises a flexible layer, and the first flexible sleeve and the second flexible sleeve are integrally connected to the flexible layer.

19. The sex toy according to claim 1, wherein the first stimulation portion further comprises a third massage finger and a fourth massage finger, the third massage finger is fixedly connected to the first massage finger, the fourth massage finger is fixedly connected to the second massage finger, and the third massage finger and the fourth massage finger are symmetrically provided.

20. The sex toy according to claim 1, wherein two vibration members are provided, and the two vibration members are respectively provided in the first massage finger and the second massage finger.

21. A sex toy, comprising:

a flexible first stimulation portion, comprising a first massage finger provided on a first side and a second massage finger provided on a second side opposite to the first side, wherein the first massage finger extends toward the second side, the second massage finger extends toward the first side, and the first massage finger and the second massage finger cooperatively enclose a first cavity;

a first driving mechanism configured to drive the first massage finger and the second massage finger to move toward or away from each other, thereby changing a radial size of the first cavity;

a vibration member provided at the flexible first stimulation portion; and a flexible second stimulation portion, provided at one end of the first stimulation portion and provided with a second cavity, wherein the first cavity is communicated with the second cavity to collectively form a stimulation chamber for accommodating a male penis.

22. A sex toy, comprising:

a base having a first end and a second end opposite to each other along a longitudinal direction of the base, and having a first side and a second side opposite to each other along a lateral direction of the base;

a first stimulation member provided on the base adjacent to the first end of the base, wherein the first stimulation member comprises a first massage portion provided on the first side of the base and a second massage portion provided on the second side of the base, the first massage portion has a first concave surface facing the second massage portion, the second massage portion has a second concave surface facing the first massage portion, and the first concave surface and the second concave surface enclose a cylindrical first cavity;

a second stimulation member provided on the base adjacent to the second end of the base, the second stimulation member being spaced from the first stimulation member, wherein the second stimulation member is hollow cylindrical defining a cylindrical second cavity, and at least one end of the second cavity adjacent to the first stimulation member is opened; and two vibration motors provided in the first massage portion and the second massage portion respectively, wherein the first concave surface, the second concave surface and an inner periphery of the second stimulation member are configured to contact a male penis.

* * * * *